United States Patent
Numajiri

(10) Patent No.: US 8,529,206 B2
(45) Date of Patent: Sep. 10, 2013

(54) WIND TURBINE GENERATOR AND YAW ROTATION CONTROL METHOD FOR WIND TURBINE GENERATOR

(75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/674,651

(22) PCT Filed: Jan. 27, 2010

(86) PCT No.: PCT/JP2010/051062
§ 371 (c)(1),
(2), (4) Date: Aug. 9, 2010

(87) PCT Pub. No.: WO2011/092810
PCT Pub. Date: Aug. 4, 2011

(65) Prior Publication Data
US 2012/0112458 A1    May 10, 2012

(51) Int. Cl.
*F03D 7/04* (2006.01)

(52) U.S. Cl.
USPC ........ 416/1; 416/31; 416/36; 416/37; 416/41; 416/170 R; 290/55

(58) Field of Classification Search
USPC ........... 416/1, 31, 36, 37, 41, 170 R; 290/44, 290/55
See application file for complete search history.

(56) References Cited

U.S. PATENT DOCUMENTS

| | | | | |
|---|---|---|---|---|
| 4,474,531 A | * | 10/1984 | Weiss | 416/31 |
| 7,347,667 B2 | | 3/2008 | Wobben | |
| 2010/0054939 A1 | * | 3/2010 | Hoffmann | 290/44 |

FOREIGN PATENT DOCUMENTS

| | | |
|---|---|---|
| DE | 19739162 A1 | 3/1999 |
| JP | 4058341 B2 | 3/2008 |
| JP | 2008-286156 A | 11/2008 |
| JP | 2008-288156 A | 11/2008 |

OTHER PUBLICATIONS

Canadian Intellectual Property Office, "Notice of Allowance for CA 2,693,802", Oct. 1, 2012.
Chinese Patent Office, "Office Action for CN 201080000646.X", Jan. 17, 2013.

* cited by examiner

*Primary Examiner* — Christopher Verdier
(74) *Attorney, Agent, or Firm* — Manabu Kanesaka; Kenneth M. Berner; Benjamin J. Hauptman

(57) ABSTRACT

There is provided a yaw rotation control method for a wind turbine generator that does not require a yaw motor and is advantageous for a reduction in cost and a reduction in size and weight of a nacelle. A control unit performs, according to a deviation between wind direction information ($\theta w$) obtained from a wind direction detecting unit and a present state yaw angle ($\theta z$) obtained from a yaw rotating position detecting unit, yaw rotation control for outputting pitch angle command values ($\theta 1$, $\theta 2$, and $\theta 3$) of yaw rotation to a pitch driving unit and directing front surfaces of rotation surfaces of wind turbine blades at the time of start. This yaw rotation control includes a step of controlling pitch angels of the wind turbine blades at a predetermined azimuth angle.

8 Claims, 12 Drawing Sheets

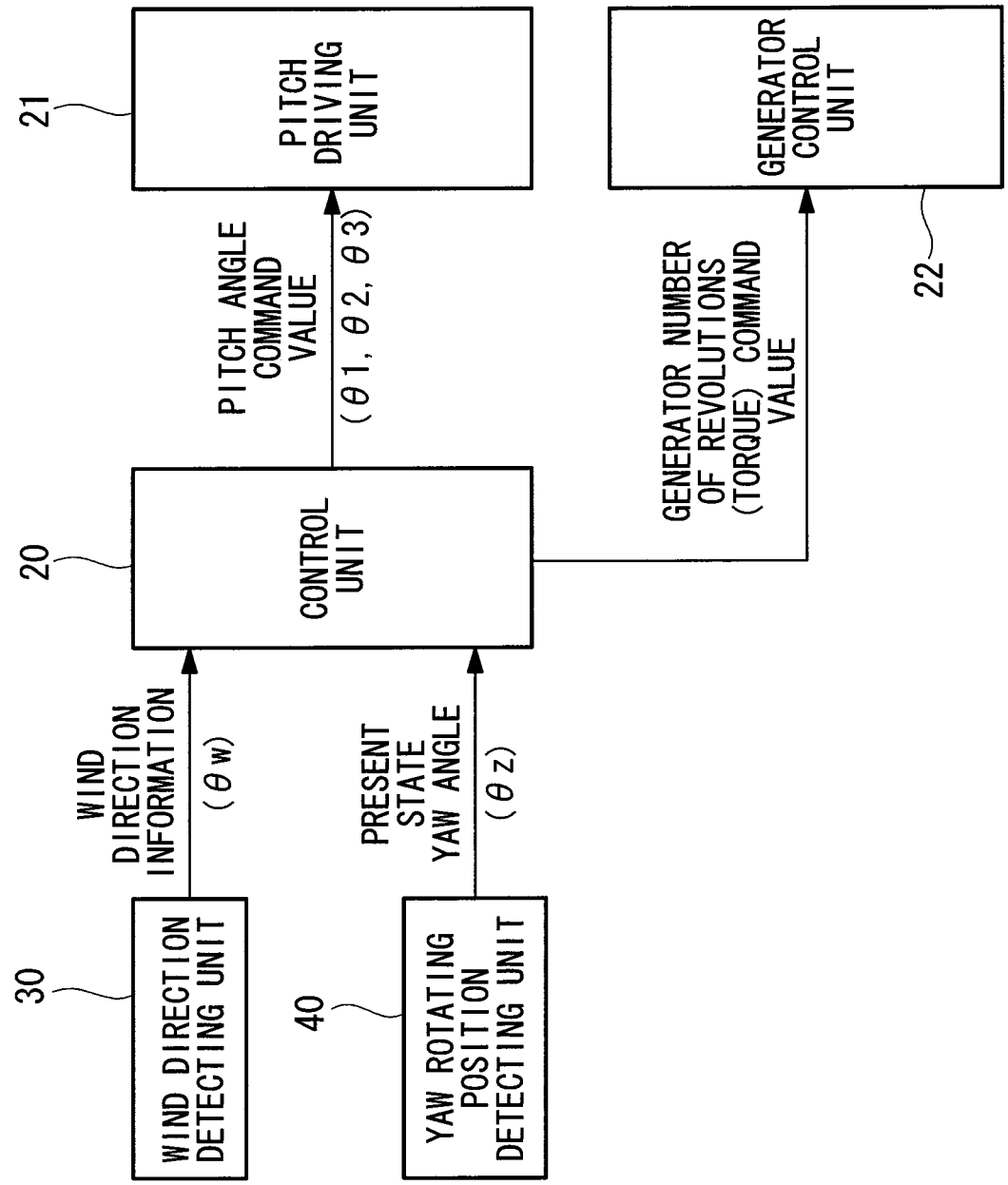

WIND

DURING STOP

WIND

MOTORING

WIND

YAW ROTATION CONTROL

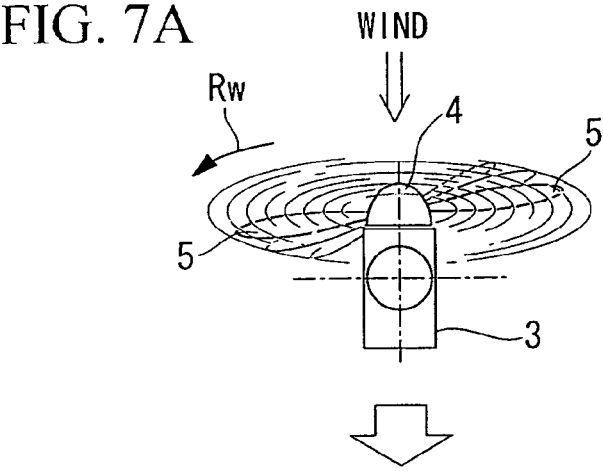
FIG. 7A
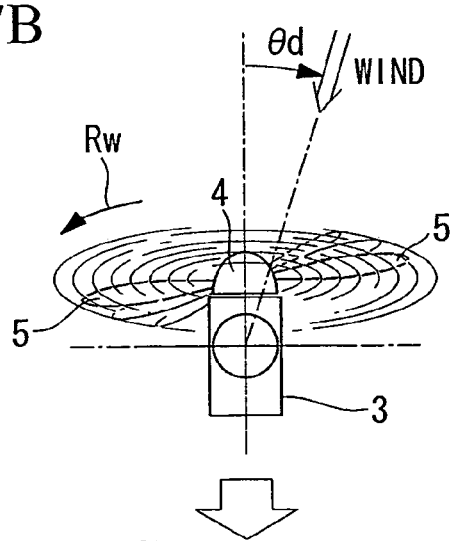
FIG. 7B
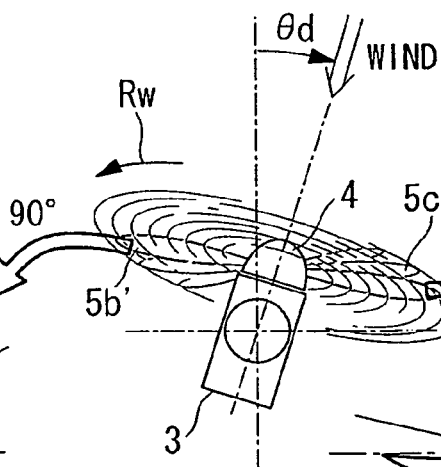
FIG. 7C
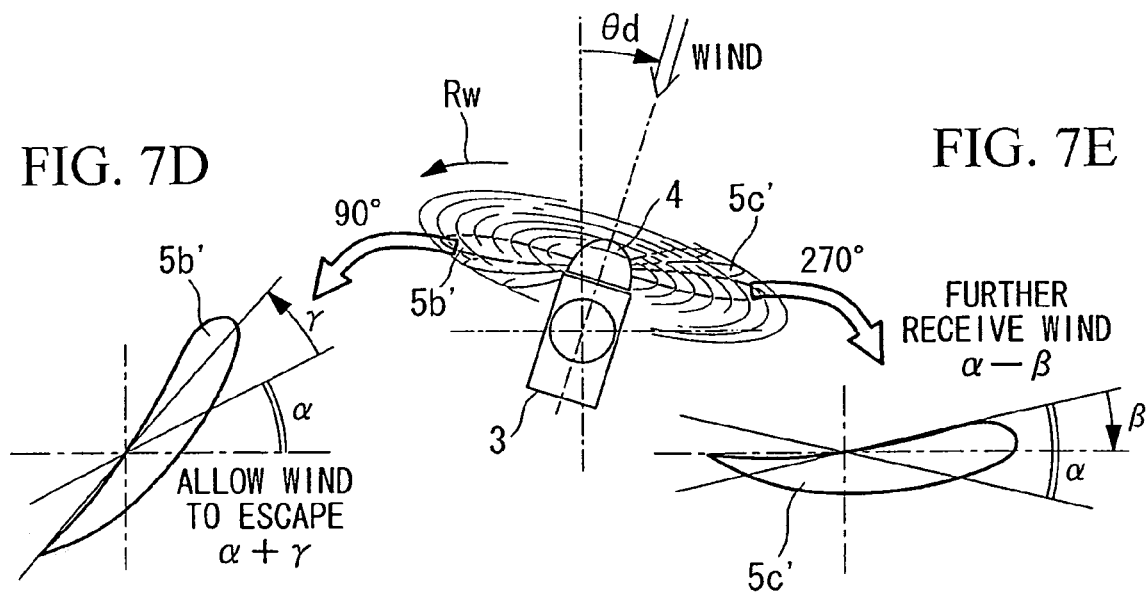
FIG. 7D
FIG. 7E

WIND TURBINE GENERATOR AND YAW ROTATION CONTROL METHOD FOR WIND TURBINE GENERATOR

The present application is National Phase of International Application No. PCT/JP2010/051062 filed Jan. 27, 2010, the disclosure of which is hereby incorporated by reference herein in its entirety.

TECHNICAL FIELD

The present invention relates to a wind turbine generator in which a main shaft, which receives wind power and rotates, drives a generator to generate power, and, more particularly to yaw rotation of a wind turbine unit set in an upper part of a tower in the wind turbine generator and a yaw rotation control method.

BACKGROUND ART

A wind turbine generator is an apparatus in which a rotor head including wind turbine blades receives wind power and rotates and, for example, a gear box increases speed of this rotation and drives a generator to thereby generate power. The rotor head including the wind turbine blades is coupled to the gear box and the generator in a nacelle set in an upper part of a tower (a column) via a main shaft. Therefore, to adjust the direction of the rotor head to a wind direction that always fluctuates (to set a rotor rotation surface to be right opposed to the wind direction), for example, in a wind generation apparatus of an up-wind type, it is necessary to yaw-rotate (rotate on a substantially horizontal plane) the nacelle on the tower to receive wind from the front of the rotor head.

In the above explanation, the rotor head and the nacelle, both of which are set in the upper part of the tower and coupled via the main shaft, are generally referred to as wind turbine unit.

In the conventional wind turbine generators, for example, a yaw driving apparatus is mounted on a large wind turbine having large blade length. This yaw driving apparatus is an apparatus that, for example, as shown in FIG. 10, yaw-rotates a large nacelle 3 with driving force of a yaw motor 50 and controls the yaw rotation such that a rotor rotation surface is set right opposed to a wind direction following the wind direction. Reference numeral 2 in the drawing denotes a tower, 3 denotes a nacelle, 3a denotes a nacelle base plate, 51 denotes a driving gear, 52 denotes a fixed gear, 53 denotes a roller bearing, and 54 denotes a yaw braking device. It would be also possible to employ a slide bearing instead of the roller bearing 53.

On the other hand, in the conventional wind turbine generators, as often seen in a small wind turbine having small blade length, there is also a wind turbine generator that does not have the yaw driving apparatus as a passive yaw.

In the yaw driving apparatus, according to an increase in size of the wind turbine generator, the yaw motor, the driving gear, and the like are also increased in size. Such an increase in size of the yaw driving apparatus causes hindrance of a reduction in size and weight of the nacelle because demands concerning complication of the nacelle base plate and a maintenance space increase.

Therefore, it is proposed that an angle command value obtained by adding a control command value around the yaw to a reference command value for offsetting load around a tower shaft that acts on wind turbine blades is calculated and pitch angle command values for the wind turbine blades are set on the basis of this angle command value. Specifically, since loads of the wind turbine blades are measured to control a pitch angle for each of the wind turbine blades and the wind turbine unit is rotated by using aerodynamic force acting on the wind turbine blades, it is possible to reduce the size of the yaw motor and reduce frequency of use. (See, for example, Patent Literature 1)

CITATION LIST

Patent Literature

{Patent Literature 1} Japanese Unexamined Patent Application, Publication No. 2008-286156

DISCLOSURE OF INVENTION

As explained above, the conventional yaw driving apparatus causes the direction of the wind turbine unit to follow a change in a wind direction using the driving force of the yaw motor to thereby control the rotor rotation surface to be always right opposed to the wind direction.

However, the yaw driving apparatus of the wind turbine generator being increased in size has a problem in that initial cost and running cost are increased.

For the conventional yaw driving apparatus, it is necessary to secure a setting space on the nacelle base plate of the wind turbine unit and machine a setting seat surface of the yaw motor. Further, it is also necessary to secure a maintenance space. Therefore, a problem is pointed out in that a reduction in size and weight of the nacelle is hindered.

On the other hand, in the case of the wind turbine generator without the yaw driving apparatus, it is a problem how the wind turbine is set right opposed to a wind direction according to the wind direction. Specifically, most of wind turbine generators without the yaw driving apparatus are small and, therefore, yaw-rotate in sensitive response to even a wind direction change in a short time. Therefore, it is likely that various kinds of load acting on the entire wind turbine increase.

As explained above, in the conventional wind turbine generators, the yaw driving apparatus causes hindrance of a reduction of cost and a reduction in size and weight of the nacelle explained above. On the other hand, the conventional wind turbine generators have the problem in that the wind turbine generator sensitively responds to even a wind change in a short time unless the yaw driving apparatus is not provided. Therefore, there is a demand for development of a wind turbine generator in which such problems are solved.

The present invention has been devised in view of the above circumstances and it is an object of the present invention to provide a wind turbine generator that makes it unnecessary to provide a yaw driving apparatus for controlling the direction of a wind turbine unit with a yaw motor and enables yaw control advantageous for a reduction in cost and a reduction in size and weight.

In order to solve the problems, the present invention adopts the following solutions.

A yaw rotation control method for a wind turbine generator according to the present invention includes: an information acquiring step for acquiring azimuth angle information of a wind turbine blade rotation surface and wind direction information; and a yaw rotating step for driving, according to a deviation between the azimuth angle information and the wind direction information, a front surface of the wind turbine blade rotation surface in an upwind direction at the time of start of the wind turbine generator, wherein the yaw rotating step includes a pitch angle control step for controlling wind turbine blade pitch angles at a predetermined azimuth angle (rotation angles of wind turbine blades).

With such a yaw rotation control method according to the present invention, since the yaw rotating step includes the pitch angle control step for controlling wind turbine blade pitch angles at the predetermined azimuth angle, at the time of start of the wind turbine generator, it is possible to, by individually changing the wind turbine blade pitch angles, effectively use wind power acting on the wind turbine blades and obtain yaw rotating force for yaw-rotating the wind turbine unit with aerodynamic force to direct the front surface of the wind turbine blade rotation surface to the upwind direction. The time of start in this case includes, in addition to the time of start for starting operation of the wind turbine generator in a shutdown state, a state during operation in which the operation of the wind turbine generator is continued.

In the invention explained above, it is preferable that, in the pitch angle control step, the wind turbine blade pitch angles are controlled to be pitch angles further on a fine side or a feather side than pitch angles at preceding and following azimuth angles at an azimuth angle of about 90 degrees and/or about 270 degrees. This makes it possible to efficiently obtain a yaw rotating force by aerodynamic force. Specifically, it is possible to generate counterclockwise or clockwise yaw rotating force by aerodynamic force by performing pitch angle control for changing the pitch angles to the fine side in a position of the azimuth angle of about 90 degrees and changing the pitch angles to the feather side in a position of the azimuth angle of about 270 degrees or pitch angle control for changing the pitch angles to the feather side in the position of the azimuth angle of about 90 degrees and changing the pitch angles to the fine side in the position of the azimuth angle of about 270 degrees.

In the invention explained above, it is preferable that the pitch angle control step includes a motoring step for rotating a generator as a motor, and, in the motoring step, the wind turbine blade pitch angles are controlled to be pitch angles further on a fine side or a feather side than pitch angles at preceding and following azimuth angles at an azimuth angle of about 0 degree and/or about 180 degrees. This makes it possible to obtain yaw rotating force by aerodynamic force from the wind turbine blades rotated by motoring even when natural wind power is absent or small.

In the invention explained above, it is preferable that the number of revolutions of the generator is gradually reduced after reaching a predetermined number of revolutions. This makes it possible to gradually reduce the number of revolutions after the starting of yaw rotation that requires largest driving force is completed and minimize electric power required for the motoring.

Alternatively, the difference between pitch angles of two blades is maximized at the time of starting yaw rotation with the number of revolutions of the motor being maintained constant.

In the invention explained above, it is preferable that the number of revolutions of the generator is kept substantially constant after reaching the predetermined number of revolutions. This makes it possible to minimize the electric power required for the motoring using the yaw rotating force by the wind power as an assist.

A yaw rotation control method for a wind turbine generator according to the present invention includes: an information acquiring step for acquiring azimuth angle information of a wind turbine blade rotation surface and wind direction information; and a shutdown time yaw rotating step for driving, according to a deviation between the azimuth angle information and the wind direction information, a front surface of the wind turbine blade rotation surface in a downwind direction at the time of shutdown of the wind turbine generator, wherein the shutdown time yaw rotating step includes a shutdown time pitch angle control step for controlling wind turbine blade pitch angles at a predetermined azimuth angle.

With such a yaw rotation control method according to the present invention, since the shutdown time yaw rotating step includes the shutdown time pitch angle control step for controlling wind turbine blade pitch angles at the predetermined azimuth angle, at the time of shutdown of the wind turbine generator, it is possible to, by individually changing the wind turbine blade pitch angles, obtain yaw rotating force for yaw-rotating the wind turbine unit to a desired shutdown position with aerodynamic force effectively using wind power acting on the wind turbine blades. Specifically, at the time of shutdown of the wind turbine generator, the wind turbine unit yaw-rotates following downwind and performs stable shutdown in a state in which the front surface of the wind turbine blade rotation surface is directed in the downwind direction. This makes it possible to actively yaw-rotate the wind turbine unit to a stable shutdown position by carrying out the shutdown time yaw rotating step.

In the invention explained above, it is preferable that, in the yaw rotating step and the shutdown time yaw rotating step, a yaw motor is not used in driving the wind turbine blade rotation surface. This makes it possible to reduce cost for yaw control and reduce the size and weight of a nacelle.

A wind turbine generator according to the present invention is configured such that a wind turbine unit including plural wind turbine blades is supported to be capable of yaw-rotating with respect to a tower and receives wind power from the front of the wind turbine unit according to a fluctuating wind direction to generate power, the wind turbine generator including: a generator that is driven by the wind power received by the wind turbine blades to generate power and can be changed to be applied as a motor; a pitch driving unit that individually controls pitch angles of the wind turbine blades; a wind direction detecting unit that detects fluctuating wind direction information; and a control unit that performs wind turbine blade pitch angle control according to the yaw rotation control method according to any one of first to seventh aspects, calculates, for each of wind turbine blades, a pitch angle command value for causing, with aerodynamic force, power for yaw-rotating the wind turbine unit, and outputs the pitch angle command value to the pitch driving unit.

With such a wind turbine generator according to the present invention, the wind turbine generator includes: the generator that is driven by the wind power received by the wind turbine blades to generate power and can be changed to be applied as a motor; the pitch driving unit that individually controls pitch angles of the wind turbine blades; the wind direction detecting unit that detects fluctuating wind direction information; and the control unit that performs wind turbine blade pitch angle control according to the yaw rotation control method according to any one of first to seventh aspects, calculates, for each of wind turbine blades, a pitch angle command value for causing, with aerodynamic force, power for yaw-rotating the wind turbine unit, and outputs the pitch angle command value to the pitch driving unit. Therefore, the pitch driving unit can individually change the pitch angles of the wind turbine blades and yaw-rotate the wind turbine unit with yaw rotating force by the aerodynamic force effectively using the wind power acting on the wind turbine blades.

In the invention explained above, it is preferable that the control unit performs motoring using the generator as the motor according to an operation state and supplements yaw rotating force. This makes it possible to use, as the yaw rotating force, wind power generated by rotating the wind turbine blades with the motoring, for example, when the wind turbine generator is started from a low wind speed state. Therefore, the yaw rotating force obtained by the motoring enables independent yaw rotation or can supplement insufficiency of the aerodynamic force (the yaw rotating force) generated by wind. Therefore, the conventional yaw driving apparatus that performs the yaw rotation control using the driving force of the yaw motor is unnecessary.

In this case, a difference in an operation state means distinction of the time of start for starting the operation of the wind turbine generator, the time of operation shutdown, and during operation and a difference due to strength or weakness or the like of the wind power.

ADVANTAGEOUS EFFECTS OF INVENTION

According to the present invention explained above, even at the time of start and at the time of shutdown of the wind turbine generator, it is possible to obtain the yaw rotating force by the aerodynamic force effectively using the pitch driving unit that individually controls the pitch angles of the plural wind turbine blades and perform the yaw control for yaw-rotating the wind turbine unit according to a change in a wind direction and directing the front surface of the wind turbine blade rotation surface to the upwind direction. Therefore, the conventional yaw driving apparatus that controls the direction of the wind turbine unit with the yaw motor is unnecessary. Consequently, in the wind turbine generator according to the present invention, it is possible to reduce cost for the yaw control for the wind turbine unit. Further, it is possible to perform yaw control advantageous for a reduction in size and weight of a nacelle included in the wind turbine unit.

BRIEF DESCRIPTION OF DRAWINGS

FIG. 1B is a block diagram showing, as another embodiment of the wind turbine generator according to the present invention, a yaw rotating mechanism (with motoring) for performing yaw rotation control for a wind turbine unit.

FIGS. 7A-7E are explanatory diagrams showing a procedure of yaw rotation control for yaw-rotating, with aerodynamic force, the wind turbine unit during operation.

DESCRIPTION OF EMBODIMENTS

An embodiment of a wind turbine generator according to the present invention is explained below with reference to the drawings.

Figure 3:
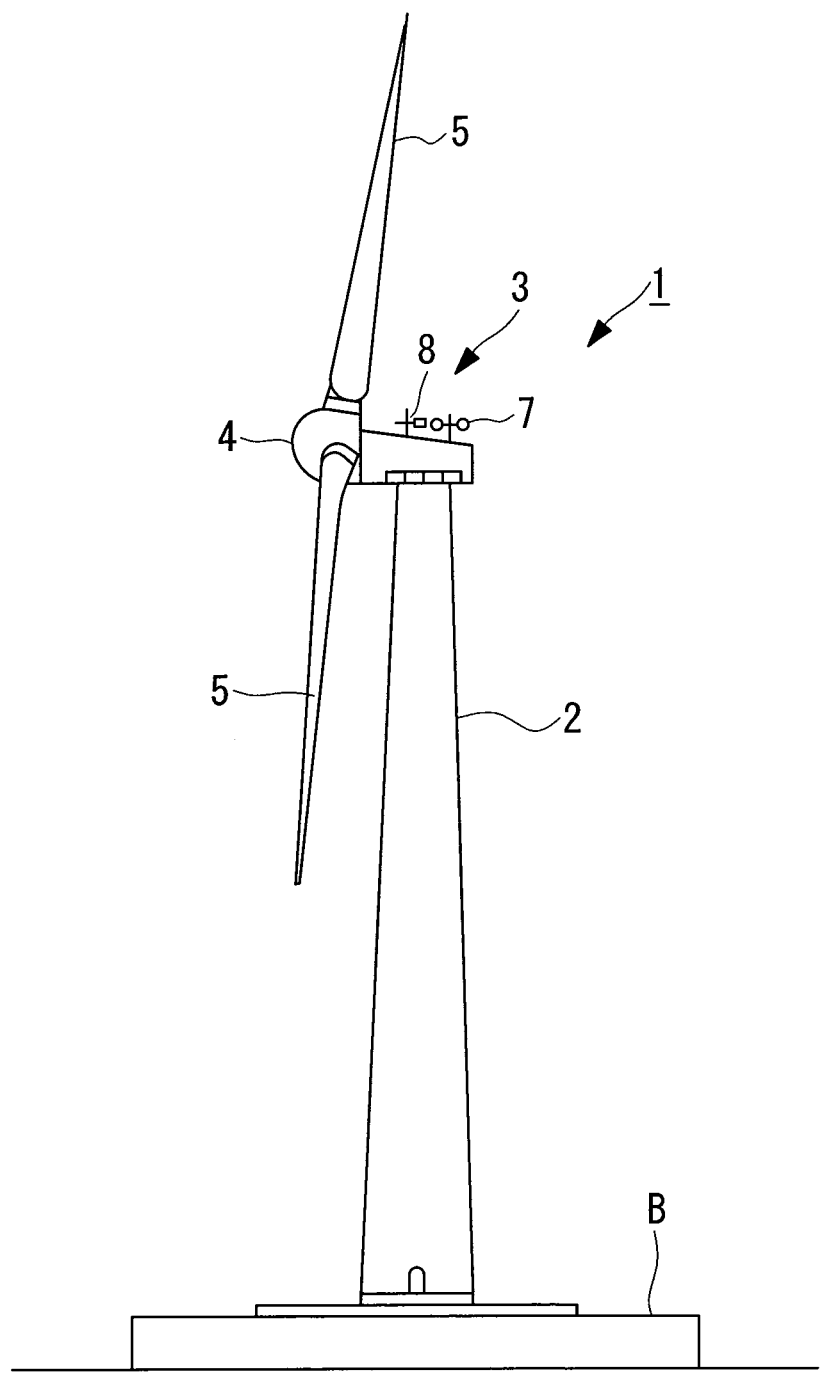
FIG. 3 is a diagram showing an example of an overall configuration of the wind turbine generator according to the present invention.

A wind turbine generator 1 shown in FIG. 3 is a wind turbine of an upwind type including a tower (also referred to as "column") 2 vertically provided on a base B, a nacelle 3 set at the upper end of the tower 2, and a rotor head 4 rotatably supported around a rotation axis (an x axis in FIG. 5) in a substantially parallel lateral direction and provided on a front end side of the nacelle 3. In the following explanation, the nacelle 3 and the rotor head 4 set at the upper end of the tower 2 and coupled via a main shaft 9 as shown in FIG. 4 are generally referred to as "wind turbine unit".

Plural (e.g., three) wind turbine blades (blades) 5 are attached to the rotor head 4 radially around the rotation axis of the rotor head 4. Consequently, the power of wind hitting the front surfaces of the wind turbine blades 5 from the rotation axis direction of the rotor head 4 is converted into power for rotating the rotor head 4 around the rotation axis.

An anemometer 7 that measures a wind speed value around the nacelle 3 when necessary and an anemoscope 8 that measures a wind direction are set in an appropriate place (e.g., an upper part) on the outer circumferential surface of the nacelle 3.

Figure 4:
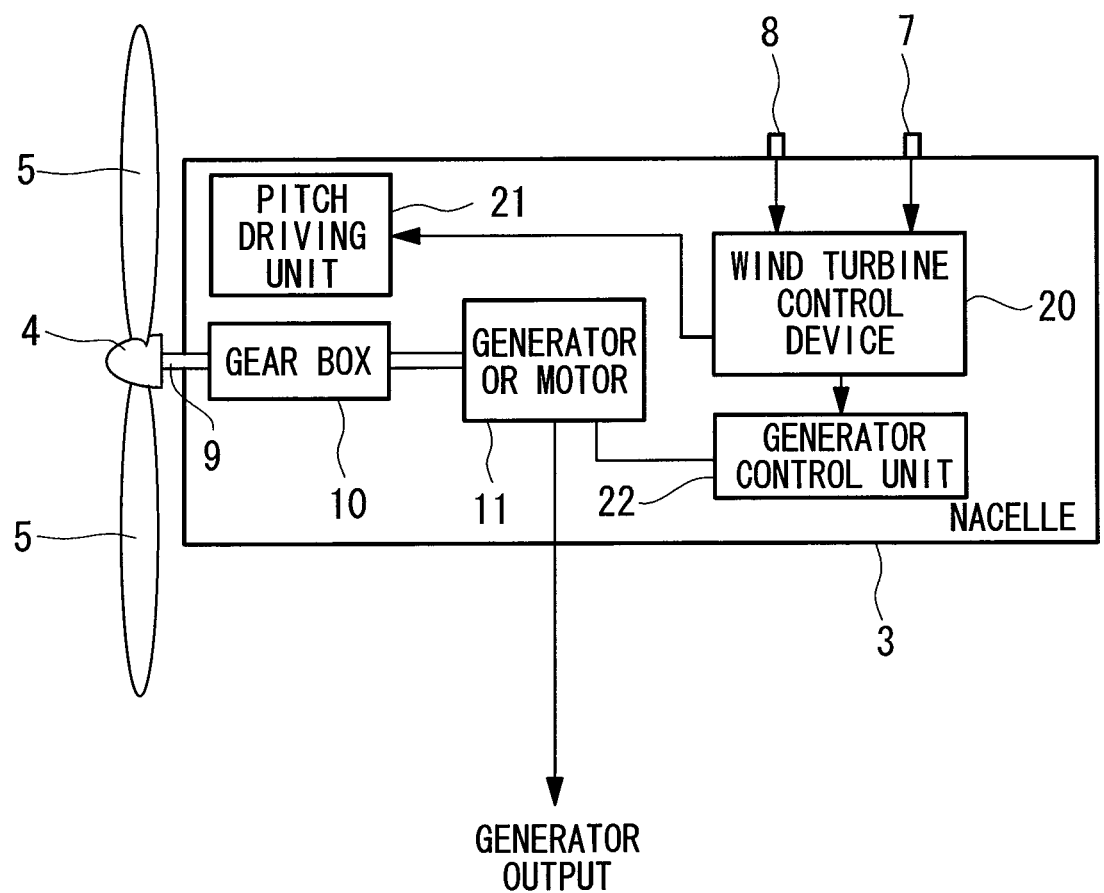
FIG. 4 is a diagram showing an example of a schematic configuration of the wind turbine unit.
Figure 5:
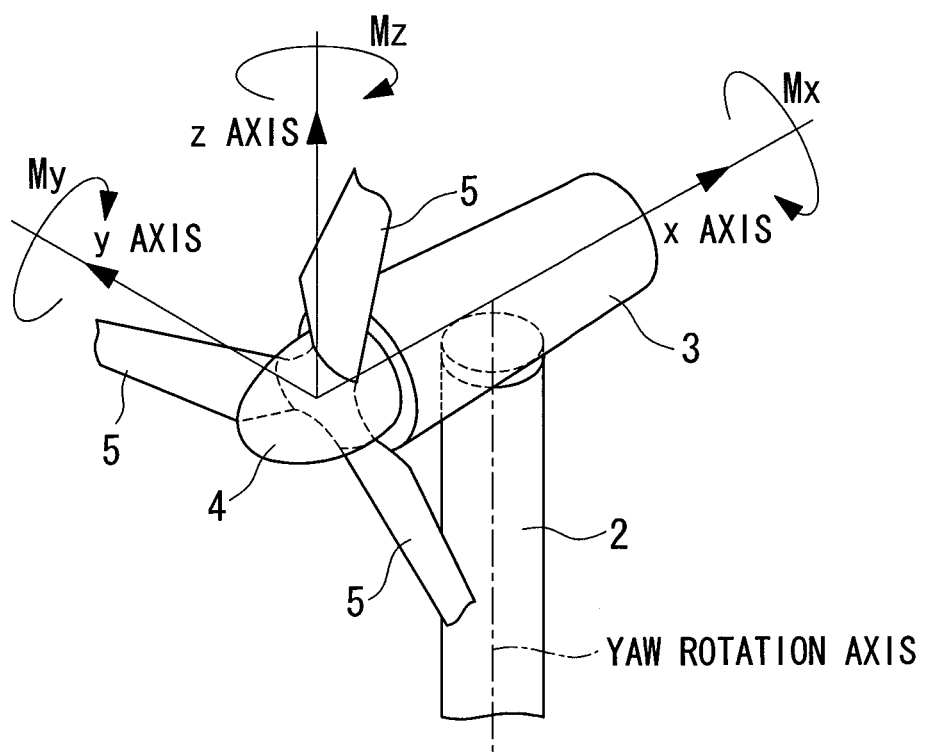
FIG. 5 is a diagram for explaining definitions of x, y, and z axes in the wind turbine generator and the wind turbine unit.

In the inside of the nacelle 3, for example, as shown in FIG. 4, a generator 11 coupled to the rotor head 4 via the gear box 10 is set. Specifically, the number of revolutions of the rotor head 4 is transmitted to the gear box 10 coupled thereto via the main shaft 9, whereby the output side of the gear box 10 has an increased value. The generator 11 is driven at the number of revolutions on the output side increased via the gear box 10, whereby electric power generated by the generator 11 is obtained.

Further, in the inside of the nacelle 3, a wind turbine control device 20 that performs operation control for the wind turbine generator 1 and a pitch driving unit (a variable pitch mechanism) 21 that receives a control signal from this wind turbine control device 20 and individually changes pitch angles of the wind turbine blades 5 are provided.

Furthermore, in the inside of the nacelle 3, a generator control unit 22 that receives a control signal from the wind turbine control device 20 and controls the generator 11 is provided. When the generator 11 is used as a motor at the time of motoring explained later, this generator control unit 22 performs operation control (motoring control) for the generator 11 driven as the motor.

In the wind turbine generator 1 having the configuration explained above, a yaw rotating mechanism for performing yaw rotation control for the wind turbine unit is provided. The yaw rotating mechanism for performing the yaw rotation control for the wind turbine unit is explained in detail below with reference to a block diagram of FIG. 1A and a flowchart of FIG. 2A.

Figure 1A:
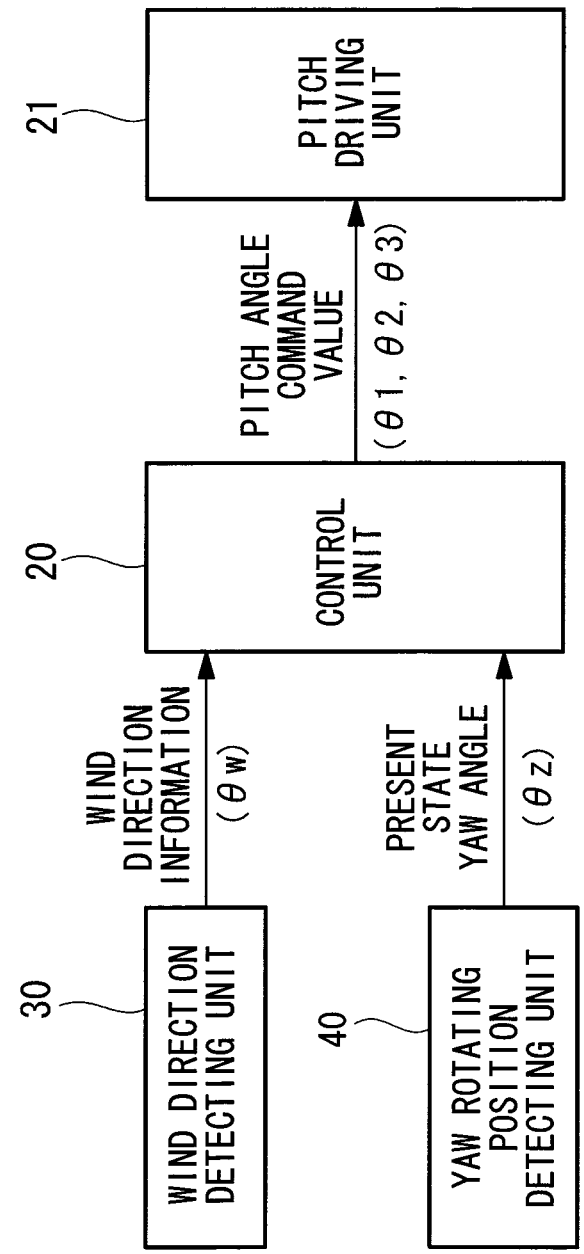
FIG. 1A is a block diagram showing, as an embodiment of a wind turbine generator according to the present invention, a yaw rotating mechanism (without motoring) for performing yaw rotation control for a wind turbine unit.

The block diagram shown in FIG. 1A shows the yaw rotating mechanism for performing the yaw rotation control for the wind turbine unit. This yaw rotating mechanism is provided in the wind turbine generator 1 configured such that the wind turbine unit including the plural wind turbine blades 5 is supported to be capable of yaw-rotating with respect to the tower 2 and receives wind power from the front surface (the front surfaces of the rotation surfaces of the wind turbine blades 5) of the wind turbine unit according to a fluctuating wind direction to generate power. Specifically, in the wind turbine generator 1 of the upwind type, the yaw rotating mechanism operates to direct the front surfaces of the rotations surfaces of the wind turbine blades 5 to upwind.

This yaw rotating mechanism includes a pitch driving unit 21 that individually changes pitch angles of the wind turbine blades 5, a wind direction detecting unit 30 that detects fluctuating wind direction information ($\theta w$), a yaw rotating position detecting unit 40 that detects a present state yaw angle ($\theta z$) of the wind turbine unit, and a control unit 20 that calculates a wind direction deviation ($\theta d$) on the basis of the wind direction information ($\theta w$) and the present state yaw angle ($\theta z$), calculates, on the basis of this wind direction deviation ($\theta d$), for each of the wind turbine blades 5, a pitch angle command value ($\theta n$) for causing, with aerodynamic force, power for yaw-rotating the wind turbine unit, and outputs the pitch angle command value ($\theta n$) to the pitch driving unit 21.

In the configuration example shown in the figure, the three wind turbine blades 5 are provided and, therefore, three kinds of pitch angle command values $\theta 1$, $\theta 2$, and $\theta 3$ calculated for each of the wind turbine blades 5 are output as the pitch angle command value ($\theta n$). However, the present invention is not limited to this.

The wind direction detecting unit 30 detects wind direction information ($\theta w$) in a setting position of the wind turbine generator 1 or a peripheral region thereof and inputs the wind direction information ($\theta w$) to the control unit 20. As the wind direction information ($\theta w$) that can be used in this case, one or plural kinds of information only have to be appropriately selected and used out of, for example, information detected for each wind turbine generator 1 by the anemoscope 8 set in the nacelle 3, information detected in a position that represents a wind farm in which plural wind turbine generators 1 are set adjacent to one another (specifically, for example, information detected by setting the anemoscope 8 in the nacelle 3 of the wind turbine generator 1 selected out of the plural wind turbine generators 1 or information detected by the anemoscope 8 set in a high place in the farm), and information concerning a wind direction included in weather information that can be acquired from the outside.

The yaw rotating position detecting unit 40 detects, concerning the wind turbine unit that yaw-rotates on the substantially horizontal plane on the tower 2 around a yaw rotation axis (see FIG. 5) present substantially coinciding with the axis center of the tower 2, the present state yaw angle ($\theta z$) as a direction (a position) in the present state and inputs the present state yaw angle ($\theta z$) to the control unit 20. In other words, the yaw rotating position detecting unit 40 detects information concerning a direction in which the front surfaces of the rotation surfaces of the wind turbine blades 5 actually face (azimuth angle information of the rotation surfaces of the wind turbine blades).

Figure 10:
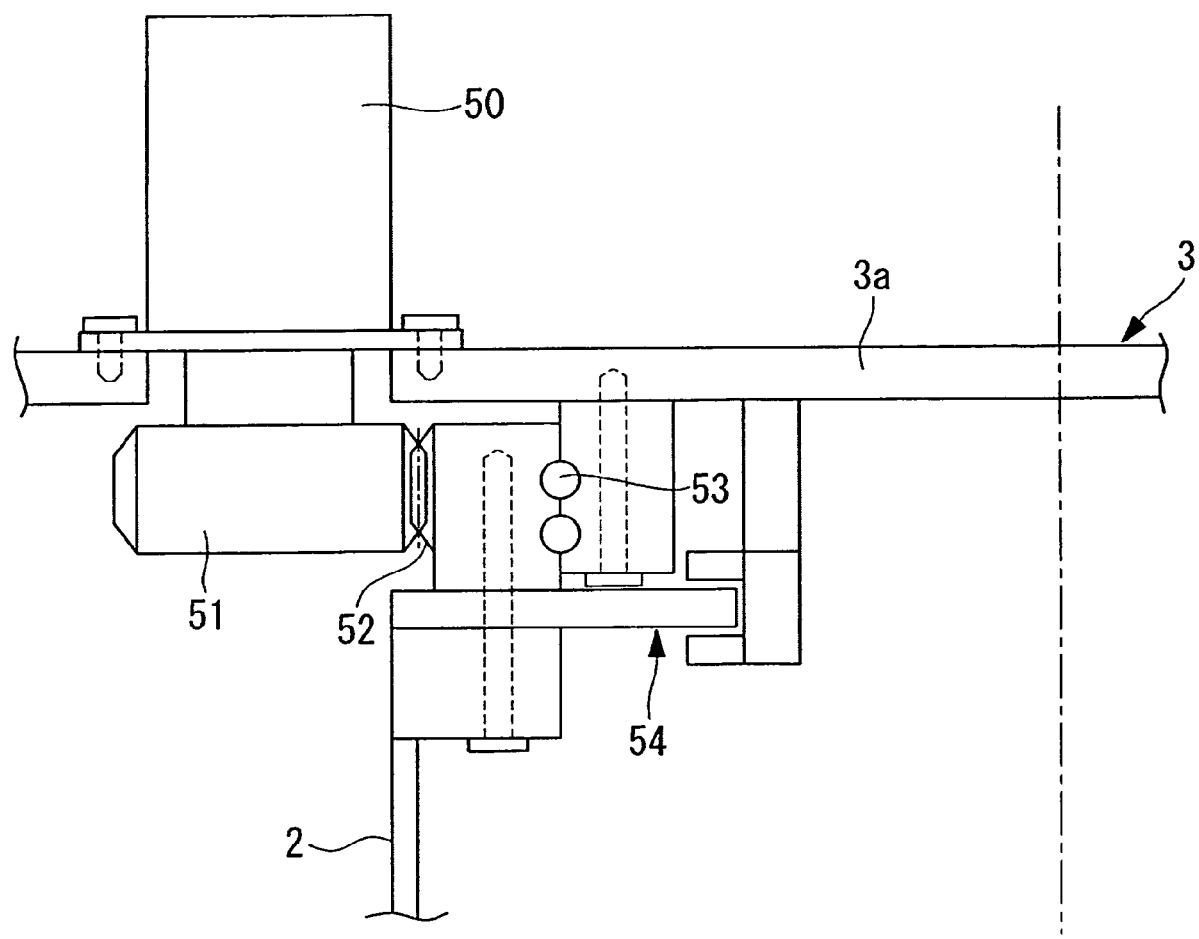
FIG. 10 is a main part sectional view showing, concerning a conventional wind turbine generator, a yaw driving apparatus and a structure around the yaw driving apparatus.

The present state yaw angle ($\theta z$) in this case is an angle for detecting in which direction (angle) in a rotating range of 360 degrees clockwise or counterclockwise the direction of the rotor head 4 (the direction of an x axis shown in FIG. 5) is when a predetermined reference direction (e.g., the north direction) is set as 0 degree. As specific means for detecting the present state yaw angle ($\theta z$), for example, there is a potentiometer that operates by meshing with a fixed gear 52 provided in a roller bearing 53 shown in FIG. 10.

The control unit 20 receives the input of the wind direction information ($\theta w$) and the present state yaw angle ($\theta z$), calculates the pitch angle command values ($\theta 1$, $\theta 2$, and $\theta 3$) for the respective three wind turbine blades 5, and outputs the pitch angle command values ($\theta 1$, $\theta 2$, and $\theta 3$) to the pitch driving unit 21. Specifically, the control unit 20 performs, according to a deviation between the wind direction information ($\theta w$) and the present state yaw angle ($\theta z$), yaw rotation control for directing the front surfaces of the rotation surfaces of the wind turbine blades at the time of start and at the time of operation of the wind turbine generator 1 to the upwind direction and directing the front surfaces of the rotation surfaces of the wind turbine blades to the downwind direction at the time of shutdown.

Figure 2A:
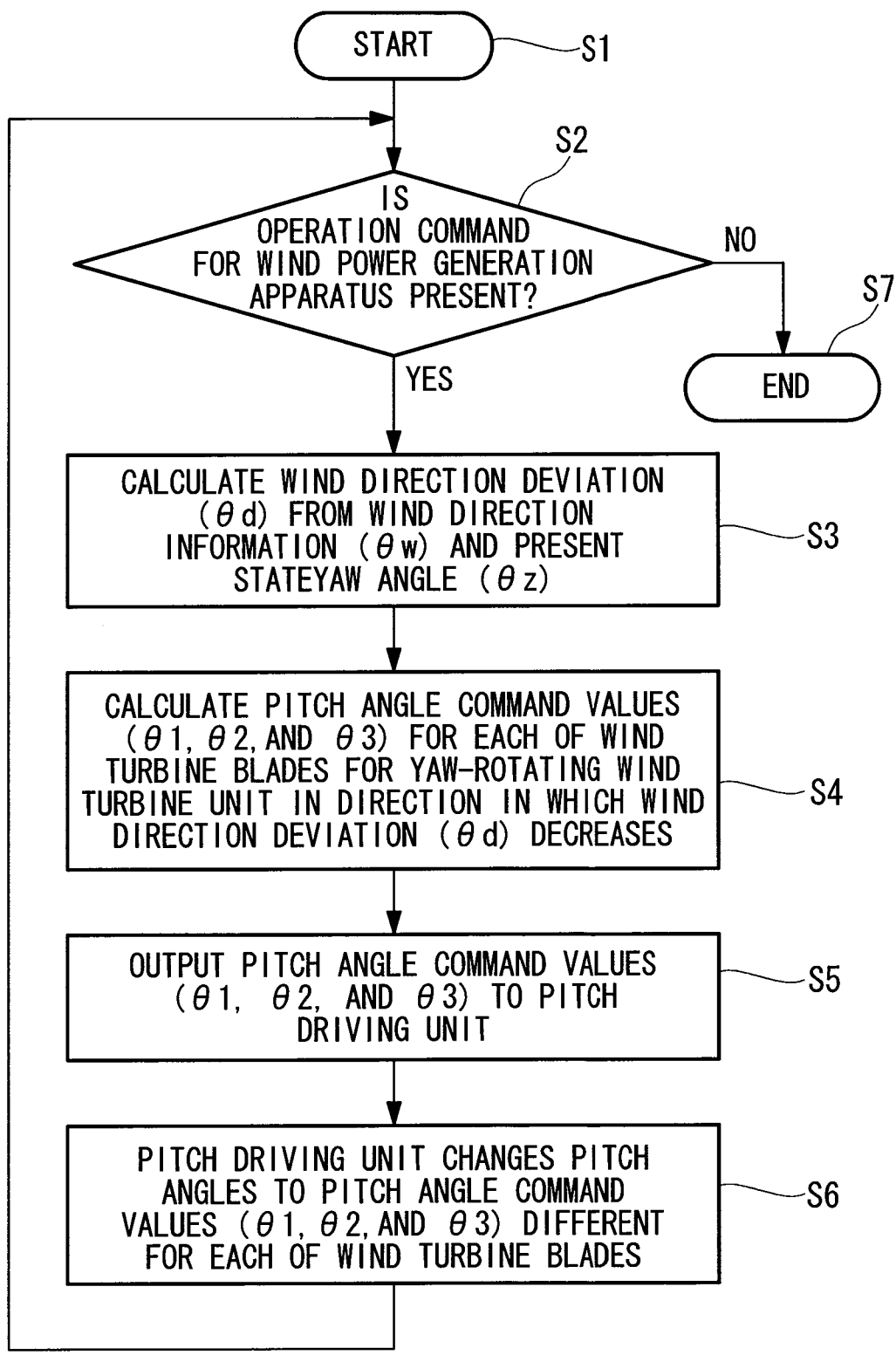
FIG. 2A is a flowchart showing an example of the yaw rotation control carried out in a control unit shown in FIG. 1A.

Specific yaw rotation control in the control unit 20 is performed, for example, as indicated by the flowchart shown in FIG. 2A.

When a control flow is started in the first step S1, the control unit 20 proceeds to the next step S2 and determines whether an operation command for the wind turbine generator 1 is present, i.e., whether the wind turbine generator 1 is in operation. When it is determined that the wind turbine generator 1 is in operation, the control unit 20 discriminates operation divisions at the time of start immediately after an operation command is issued, at the time of operation when operation is continued, and at the time of shutdown when a command for operation shutdown is issued.

According to the determination in step S2, in the case of "YES" indicating that the operation command for the wind turbine generator 1 is present, the control unit 20 proceeds to the next step S3 and calculates a pitch angle command value ($\theta n$). However, in this embodiment, since the three wind turbine blades 5 are provided, the control unit 20 starts calculation of the three kinds of pitch angle command values ($\theta 1$, $\theta 2$, and $\theta 3$). In the following explanation, the operation division is discriminated as the time of start or the time of operation.

A step of step S3 includes an "information acquiring step" for the present state yaw angle ($\theta z$) of azimuth angle information concerning the front surfaces of the rotation surfaces of the wind turbine blades 5 and the wind direction information ($\theta w$). The control unit 20 calculates the wind direction deviation ($\theta d$) as a deviation between the present state yaw angle ($\theta z$) and the wind direction information ($\theta w$). Specifically, the control unit 20 calculates an angle difference between the wind direction information ($\theta w$) indicating an actual wind direction and the present state yaw angle ($\theta z$) indicating the present direction concerning the wind turbine unit, which yaw-rotates on the tower 2, and sets the angle difference as a wind direction deviation ($\theta d = \theta w - \theta z$).

As a result, concerning the direction of the wind turbine unit, for example, when a wind direction changes, it is possible to grasp a positional relation (an angle difference) in the present state with respect to the wind direction.

After calculating the wind direction deviation ($\theta d$) in this way, the control unit 20 proceeds to the next step S4 and calculates the pitch angle command values ($\theta 1$, $\theta 2$, and $\theta 3$) for each of the wind turbine blades 5. The pitch angle command values calculated here are set, concerning the wind direction deviation ($\theta d$) calculated in step S3, to yaw-rotate the wind turbine unit in, for example, a direction in which the wind direction deviation ($\theta d$) decreases in order to direct the front surfaces of the rotation surfaces of the wind turbine blades 5 to the upwind direction.

The pitch angle command values ($\theta 1$, $\theta 2$, and $\theta 3$) for each of the wind turbine blades 5 calculated in the step of step S3 are output to the pitch driving unit 21 in the next step S5.

In the next step S6, pitch angles of the wind turbine blades 5 are changed to pitch angles of the pitch angle command values (θ1, θ2, and θ3) different for each of the wind turbine blades 5 according to the operation of the pitch driving unit 21. In this way, the step of steps S4 to S5 is a "yaw rotating step" for driving the front surfaces of the rotation surfaces of the wind turbine blades 5 in the upwind direction according to the wind direction deviation (θd).

The control unit 20 returns to step S2 again and repeats the same control, whereby the pitch angles of the wind turbine blades 5 set in this way are continued until it is determined in step S2 that an operation command for the wind turbine generator 1 is absent. Specifically, in the case of "NO" indicating that it is determined in step S2 that an operation command for the wind turbine generator 1 is absent, the control unit 20 proceeds to END of step S7 and ends the control flow.

The yaw rotating step explained above includes a "pitch angle control step" for controlling wind turbine blade pitch angles at a predetermined azimuth angle.

This pitch angle control step is a step for individually changing the wind turbine blade pitch angles at the time of start of the wind turbine generator 1, converting wind power acting on the wind turbine blades 5 into aerodynamic force, and effectively using the aerodynamic force. In the pitch angle control step, yaw rotating force for yaw-rotating the wind turbine unit with the aerodynamic force and directing the front surfaces of the rotation surfaces of the wind turbine blades to the upwind direction.

As explained above, in the yaw rotation control for the wind turbine generator 1, a control method for the yaw rotation control includes the information acquiring step for acquiring azimuth angle information and wind direction information of the rotation surfaces of the wind turbine blades and the yaw rotating step for driving the front surfaces of the rotation surfaces of the wind turbine blades in the upwind direction at the time of start according to a deviation between the azimuth angle information and the wind direction information. The yaw rotating step includes the pitch angle control step for controlling wind turbine blade pitch angles at the predetermined azimuth angle (a rotation angle of the wind turbine blades).

It is also possible to estimate the wind direction deviation (θd) from a difference in load acting on the wind turbine blades 5 at the predetermined azimuth angle. The pitch driving unit 21 may calculate the pitch angle command values (θn) on the basis of the wind direction deviation (θd) obtained by this estimation.

It is possible to perform not only control for setting the pitch angle command value (θn) to yaw-rotate the wind turbine unit in a direction in which the wind direction deviation (θd) decreases but also, for example, control for alternately setting positive and negative values such that an average of the wind direction deviation (θd) is close to zero.

Subsequently, the yaw rotation control by the control flow explained above is specifically explained. This yaw rotation control is control for controlling the wind power acting on the wind turbine blades 5 to be yaw rotating force for the wind turbine unit effectively using the pitch driving unit 21 that individually changes pitch angles of the wind turbine blades 5.

The pitch angle command values (θ1, θ2, and θ3) of the wind turbine blades 5 are set such that, as shown in FIGS. 7A-7E and 8, since the present state yaw angle (θz) coincides with a wind direction, there is no wind direction deviation (θd) and the direction of the rotor head 4 is directed to the upwind. Specifically, the pitch angle command values (θ1, θ2, and θ3) of the wind turbine blades 5 are set such that the rotor rotation surface are set right opposed to the wind direction by reducing the wind direction deviation (θd) according to an always-fluctuating wind direction or reducing an average of the wind direction deviation (θd) to be close to zero to generate yaw rotating force in a direction in which there is no wind direction deviation (θd).

Figure 8:
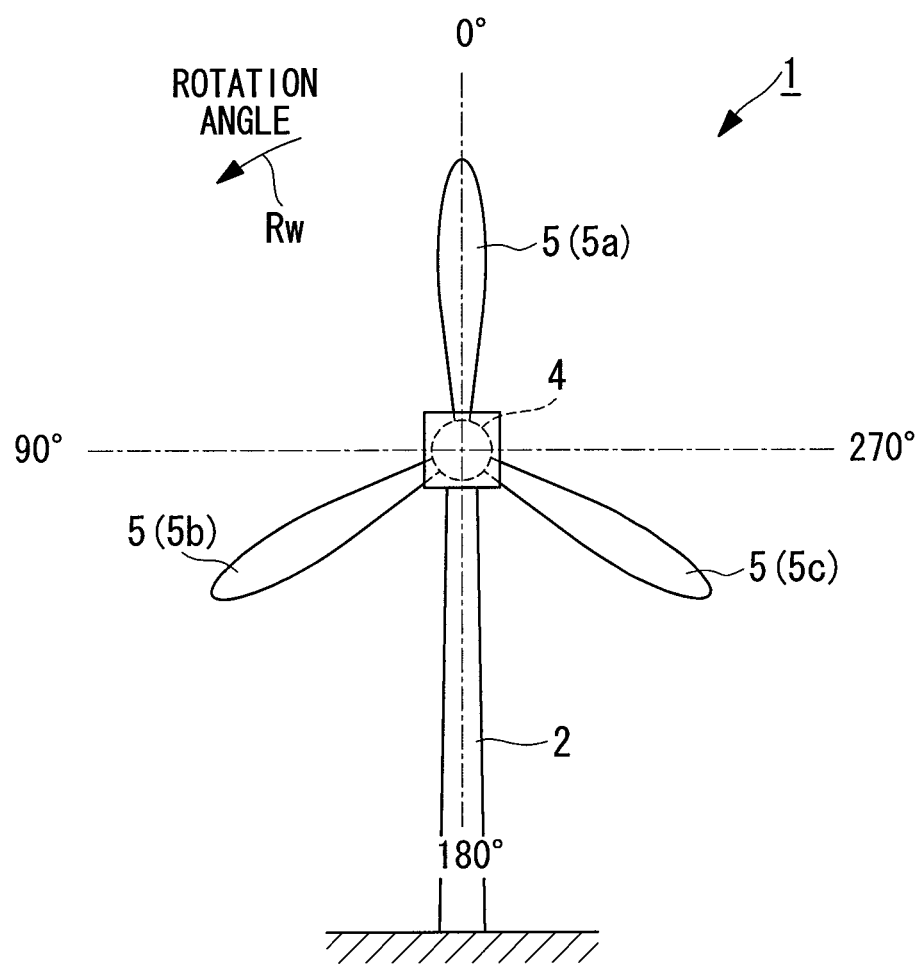
FIG. 8 is an explanatory diagram showing a definition of an azimuth angle (a rotation angle) viewed from the rear of a nacelle concerning wind turbine blades of the wind turbine unit.

In explanatory diagrams shown in FIGS. 7A-7E and 8, as indicated by an arrow Rw in FIG. 8 (a diagram of the nacelle 3 viewed from the rear side), the rotor 4 and the wind turbine blades 5 receive wind power and rotate counterclockwise. In the wind turbine generator 1 shown in FIG. 8, the three wind turbine blades 5 are provide at a pitch of 120° viewed from the rear of the nacelle. In the following explanation, when necessary, the wind turbine blade 5 in a position of a rotation angle (an azimuth angle) 0° is referred to as wind turbine blade 5a, the wind turbine blade 5 in a position of a rotation angle 120° is referred to as wind turbine blade 5b, and the wind turbine blade 5 in a position of a rotation angle 240° is referred to as wind turbine blade 5c to distinguish the wind turbine blades 5.

During the operation of the wind turbine generator 1 shown in FIG. 8, concerning the rotating wind turbine blades 5, pitch angles are independently operated (controlled) for each of the wind turbine blades 5 and yaw control for causing the rotor rotation surface to follow a wind direction to be set right opposed to the wind direction is performed as appropriate.

FIGS. 7A-7E are diagrams of the wind turbine unit viewed from above, operation of yaw rotation control for yaw-rotating the wind turbine unit clockwise from a state in which the wind direction deviation (θd) is present and setting the rotor rotation surface right opposed to a wind direction is shown. In the yaw control in this case, concerning two wind turbine blades 5b' and 5c' in rotation angle positions for receiving wind power to cause yaw rotating moment, pitch angles of the wind turbine blades 5b' and 5c' are changed in opposite directions.

To specifically explain, for the wind turbine blade 5b' rotating in a peripheral region (maximum, 0 to 180°) of a rotation angle 90°, the pitch angle command value (θn) for changing a pitch angle α in an increasing direction, i.e., a feather direction to allow wind to escape is calculated (FIG. 7D). Therefore, the pitch driving unit 21 that receives this pitch angle command value (θn) changes the pitch angle α of the wind turbine blade 5b' in the increasing direction by γ.

On the other hand, for the wind turbine blade 5c' rotating in a peripheral region (maximum, 180 to 360°) of a rotation angle 270°, the pitch angle command value (θn) for changing the pitch angle α in a reducing direction, i.e., a fine direction to further receive wind is calculated (FIG. 7E). Therefore, the pitch driving unit 21 that receives this pitch angle command value (θn) changes the pitch angle α of the wind turbine blade 5c' in the reducing direction by β.

In other words, concerning the wind turbine blade 5b', the pitch angle command value (θn) for changing the pitch angle α in a direction in which a projection area viewed from the front is increased is output. The pitch angle α is set to a new pitch angle (α+γ) increased by γ.

On the other hand, concerning the wind turbine blade 5c', the pitch angle command value (θn) for changing the pitch angle α in a direction in which a projection area viewed from the front is reduced is output. The pitch angle α is set to a new pitch angle (α−β) reduced by β.

In this case, operation for changing the pitch angle α of the wind turbine blades 5 by β and γ is performed during the rotation of the wind turbine blades 5. Such pitch angle control for the wind turbine blades 5 is active pitch control for continuously or intermittently changing, for example, while one wind turbine blade 5 rotates once, the pitch angle α, at which the wind turbine blade 5 is steadily operated at certain wind speed, to draw a general sine curve from the minimum pitch angle (α−β) to the maximum pitch angle (α+γ).

As explained above, with the control for increasing and reducing the pitch angle α of the wind turbine blades 5 according to the position of a rotation angle, it is possible to aerodynamically generate rotation force around a yaw axis in the wind turbine unit. Specifically, concerning the wind turbine blade 5b' having a rotation angle near 90°, since a pitch angle increases to allow wind to escape, yaw rotating force acting on the wind turbine blade 5b' decreases. However, concerning the wind turbine blade 5c' having a rotation angle near 270°, since a pitch angle decreases to further receive wind, yaw rotating force acting on the wind turbine blade 5c increases.

As a result, when a pitch angle is not increased or reduced, the balance of yaw rotating forces acting in substantially the same magnitudes in the same direction from the upwind to the downwind is broken. Therefore, the wind turbine unit yaw-rotates in a direction in which larger yaw rotating force acts. Specifically, in the case of the wind turbine unit shown in FIGS. 7A-7E, since yaw rotating force acting on the wind turbine blade 5c' at the rotation angle position of 270° increases, the wind turbine unit performs yaw rotation in the clockwise direction and the wind direction deviation (θd) is eliminated.

When the wind turbine unit is yaw-rotated counterclockwise, a pitch angle only has to be changed to the fine side around a rotation angle of about 90 degrees and changed to the feather side around a rotation angle of 270 degrees.

In this way, with the wind turbine generator 1 explained above, the pitch driving unit 21 individually changes the pitch angles of the wind turbine blades 5 at the time of operation. It is possible to yaw-rotate the wind turbine unit with aerodynamic force effectively using wind power acting on the wind turbine blades 5. Specifically, at the time of operation of the wind turbine generator 1, the pitch angles of the wind turbine blades 5 are individually changed to reduce the calculated wind direction deviation (θd) or reduce an average of the wind direction deviation (θd) to be close to zero and yaw rotation control for converting the wind power acting on the wind turbine blades 5 into yaw rotating force is performed. Thus, the wind turbine unit can perform yaw rotation following a change in a wind direction and set the rotor rotation surface of the wind turbine unit to be always right opposed to the wind direction toward the upwind. Therefore, by performing the yaw rotation control, the conventional yaw driving apparatus that performs the yaw rotation control using the driving force of the yaw motor is made unnecessary.

Incidentally, in the yaw rotation control of the wind turbine generator 1 explained above, in some case, yaw rotating force sufficient for performing the yaw rotation control is not obtained, for example, when wind speed is not sufficient or at the time of start when operation is started from an operation shutdown state.

Figure 2B:
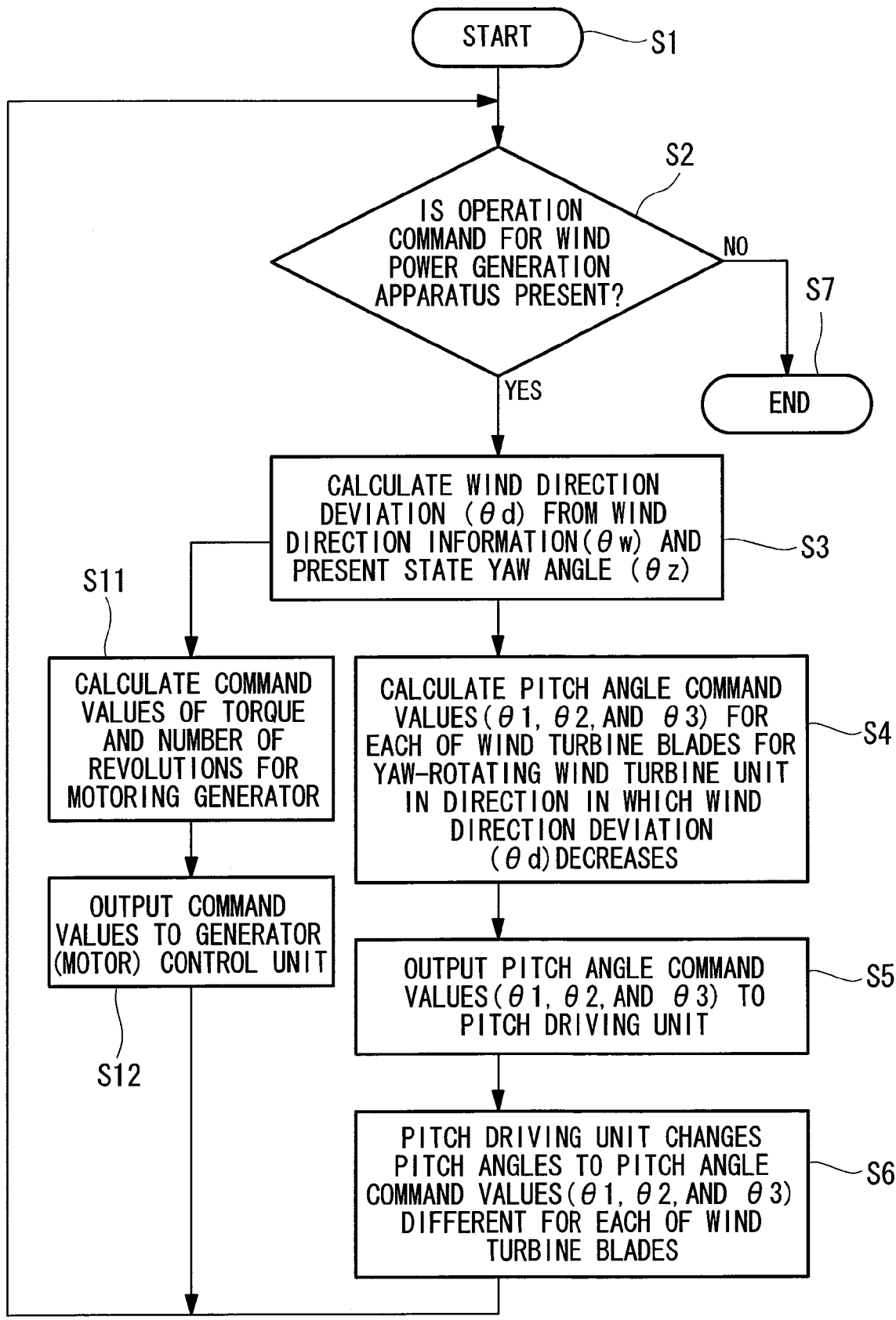
FIG. 2B is a flowchart showing an example of the yaw rotation control carried out in a control unit shown in FIG. 1B.

Therefore, in an operation state in which sufficient yaw rotating force is not obtained, for example, as shown in FIGS. 1B and 2B, the wind turbine control device 20 performs motoring using the generator 11 provided in the wind turbine unit as a motor, i.e., rotates the rotor 4 and the wind turbine blade 5 until the number of revolutions equal to or larger than, for example, 10 rpm is obtained using, as a driving source, the generator 11 functioning as the motor. This makes it possible to carry out automatic yaw rotation by wind power generated by the wind turbine blades 5.

This motoring is carried out by outputting a control command concerning the motoring from the wind turbine control device 20 to the generator control unit 22.

To specifically explain, in a flowchart shown in FIG. 2B, after calculating the wind direction deviation (θd) in a step of step S3, the wind turbine control device 20 proceeds to a step of step S11 and calculates command values of torque and the number of revolutions for motoring the generator 11 functioning as the motor. The wind turbine control device 20 outputs the command values of torque and the number of revolutions calculated in this way to the generator control unit 22 in the following step of step S12.

Since the generator control unit 22 drives the generator 11 as the motor on the basis of the command values of torque and the number of revolutions, driving force generated by the generator 11 functioning as the motor rotates the rotor 4 and the wind turbine blades 5. As a result, since wind power is caused by the rotation of the wind turbine blades 5, it is possible to perform yaw rotation by the motoring using this wind power.

The wind power caused by the wind turbine blades 5 rotating according to the motoring forms, for example, at the time of low wind speed, a state same as a state in which the wind speed is increased. Therefore, it is possible to supplement insufficient yaw rotating force. Such motoring can be easily performed if the generator 11 is a synchronous generator and, even when the generator 11 is an asynchronous generator, can be performed if the generator 11 includes an inverter.

By performing such motoring according to an operation state of the wind turbine generator 1, for example, when the wind turbine generator 1 is started from a low wind speed state, it is possible to supplement, according to the operation state, insufficiency of yaw rotating force due to wind power and aerodynamic force with wind power and aerodynamic force caused by the motoring. In this case, a difference in the operation state means a difference due to, for example, the distinction of the time of start for starting the operation of the wind turbine generator 1, the time of operation shutdown, and during operation or strength and weakness of wind power acting on the wind turbine blades 5.

Figure 6A:
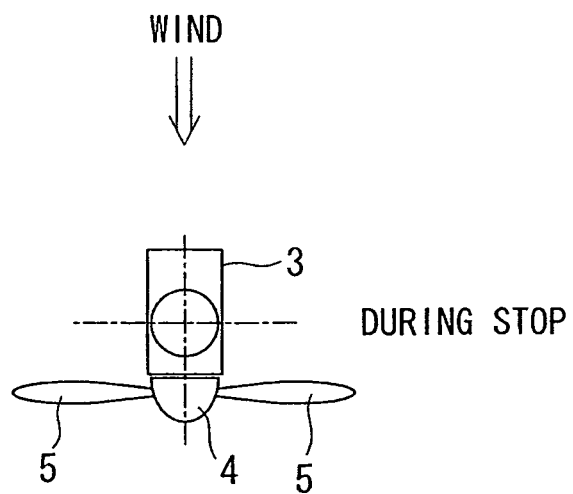
FIGS. 6A-6E are explanatory diagrams showing a procedure of motoring for setting the wind turbine unit, which is in wind operation shutdown, right opposed to a wind direction.
Figure 6B:
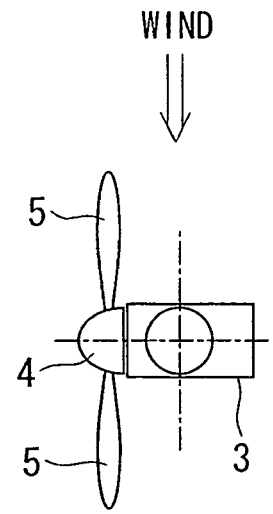

To specifically explain, for example, as shown in FIGS. 6A and 6B, in some case, in the shut-down wind turbine unit, the rotor rotation surface faces the downwind following a wind direction. Therefore, at the time of start, yaw rotation of maximum 180° is necessary. Because of the influence of wind speed, residual braking force of a yaw rotation braking device, reflection of steady yaw control, or the like, in the wind turbine unit at the time of start, in some case, the rotor rotation surface is not right opposed to the wind direction.

Figure 6C:
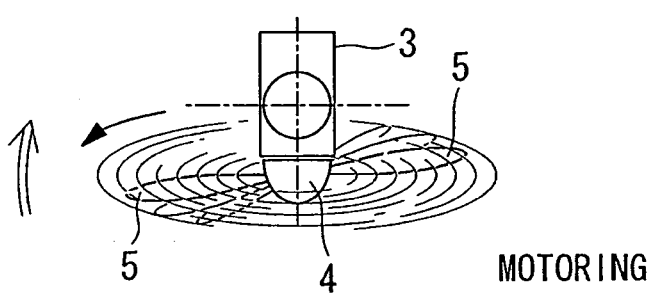
Figure 6D:
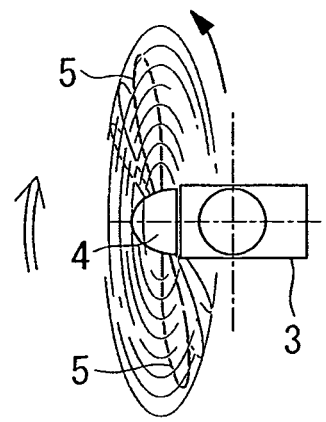
Figure 6E:
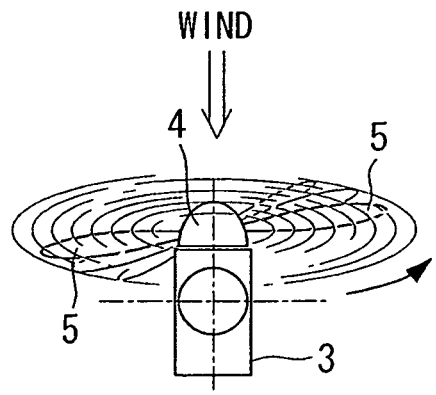

Therefore, as shown in FIGS. 6C and 6D, at the time of start of the wind turbine generator 1, in the pitch angle control step, a motoring step for first performing motoring to yaw-rotate the wind turbine unit and directing the rotor rotation surface to the upwind mainly with wind power caused by the wind turbine blades 5 is carried out. Thereafter, the motoring is stopped and switched to the yaw rotation control during operation, i.e., the yaw rotation control for individually changing the pitch angles of the wind turbine blades 5. In this motoring step, efficient motoring can be carried out by setting the pitch angles to pitch angles further on the fine side or the feather side than pitch angles around a rotation angle of about 0 degrees and/or about 180 degrees at which yaw rotating force is hardly caused.

In the motoring in this case, the number of revolutions of the generator 11 functioning as the motor may be changed according to an operation state of the wind turbine generator 1 or the number of revolutions of the generator 11 functioning as the motor may be fixed to change the pitch angles of the wind turbine blades 5 and change assist force by aerodynamic force.

When the number of revolutions of the generator 11 is changed, after the generator 11 switched to the motor and energized is started and reaches a predetermined number of revolution, the number of revolutions only has to be gradually reduced. Specifically, when the wind turbine unit in a shutdown state is yaw-rotated by the motoring, static frictional force acts and largest driving force is required until the start of the yaw rotation. Therefore, after the wind turbine unit starts and is in a state in which dynamic frictional force acts, it is possible to gradually reduce the number of revolutions of the wind turbine blades 5 by the motoring. Such a reduction in the number of revolutions means that the number of revolutions of the generator 11 functioning as the motor is reduced. Therefore, it is possible to minimize electric power required for the motoring.

When the number of revolutions of the generator 11 is kept substantially constant after reaching the predetermined number of revolutions, it is possible to minimize electric power required for the motoring using yaw rotating force by natural wind power as an assist. Specifically, since the wind turbine unit is yaw-rotated by using yaw rotating force obtained by adding up aerodynamic force generated by the motoring and aerodynamic force generated by the natural wind power, it is possible to set the number of revolutions of the wind turbine blades 5 by the motoring low. Therefore, it is possible to reduce power consumption of the generator 11 functioning as the motor.

The yaw rotation control at the time of shutdown of the wind turbine generator 1 includes an information acquiring step for acquiring azimuth angle information of the rotation surfaces of the wind turbine blades and wind direction information and a shutdown time yaw rotating step for driving, according to a deviation between the azimuth angle information and the wind direction information, the front surfaces of the rotation surfaces of the wind turbine blades to the downwind direction at the time of shutdown. The shutdown time yaw rotating step includes a shutdown time pitch angle control step for controlling pitch angles of the wind turbine blades at a predetermined azimuth angle. The shutdown time pitch angle control step in this case is a step for yaw-rotating the wind turbine unit to direct the front surfaces of the rotation surfaces of the wind turbine blades to the downwind direction. Therefore, the yaw rotation control is the same as that at the time of start and at the time of operation except that the wind turbine unit is yaw-rotated in a direction opposite to that at the time of start and at the time of operation.

By performing such yaw rotation control, it is possible to actively yaw-rotate the wind turbine unit to a stable shutdown position at the time of shutdown when a command for operation stop is issued to the wind turbine generator 1 during operation. Specifically, in a state in which the wind turbine unit is shut down, the wind turbine unit receives the natural wind power and yaw-rotates following the downwind and is stably shut down in a state in which the front surfaces of the rotation surfaces of the wind turbine blades are directed to the downwind direction. Therefore, it is possible to actively yaw-rotate the wind turbine unit to the stable shutdown position by carrying out the shutdown time yaw rotating step.

By appropriately carrying out the motoring when the operation of the wind turbine generator 1 is stopped, it is also possible to direct the rotor rotation surface to a direction same as wind direction as much as possible at the time of start.

For example, when twist equal to or larger than set twist occurs in a cable inserted through the tower 2 during operation, the motoring may be used for the purpose of forcibly yaw-rotating the wind turbine unit in order to eliminate the twist.

Figure 9:
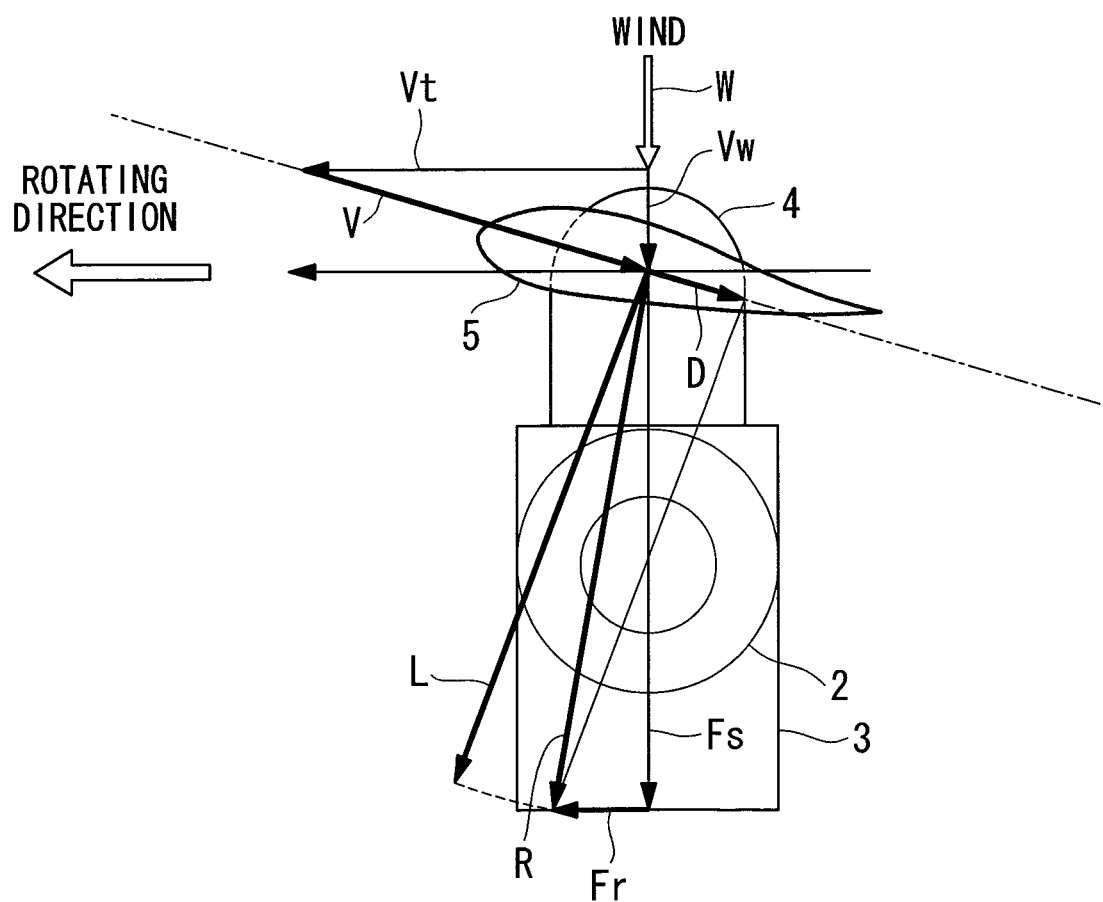
FIG. 9 is an explanatory diagram showing rotation force generated in the wind turbine blades of the wind turbine unit viewed from above.

When the motoring is carried out, the wind turbine blades may be controlled to have pitch angles at which the wind turbine generator 1 can be easily started. Specifically, as shown in an explanatory diagram (a view of the wind turbine blades 5 viewed from above) of FIG. 9, when wind blows from above the paper surface in a direction of an arrow W to the rotor head 4, relative wind having blade inflow speed (V) obtained by combining tangential direction speed (Vt) and wind speed (Vw) is given to the wind turbine blades 5.

When the wind turbine blades 5 receive the relative wind having the blade inflow speed (V), combined wind resultant force (R) in a direction different from that of the relative wind is generated. Since, usually, this combined wind resultant force (R) is not generated in a direction parallel to the relative wind, the combined wind resultant force (R) is resolved into components of force of components having different magnitudes according to a blade shape. One component of force is lift (L) and the other component of force is drag (D).

The combined wind resultant force (R) is resolved into thrust force (Fs) of a component perpendicular to a rotating direction of the wind turbine blades 5 and rotation force (Fr) in the same direction as the rotating direction. This rotation force (Fr) rotates the rotor head 4 and changes to force in a direction for generating power with wind power. This rotation force (Fr) is a value that fluctuates according to pitch angles of the wind turbine blades 5. At the time of motoring, the rotation force (Fr) can assist rotation force of the generator 11 functioning as the motor.

Therefore, for example, when the wind turbine unit is shut down in a state shown in FIGS. 6A and 6C, the pitch angles of the wind turbine blades 5 are set such that the rotation force (Fr) in a direction in which the rotation force of the motoring is assisted by wind power is generated. Specifically, the motoring is performed with the pitch angles of the wind turbine blades 5 set to pitch angles at which the wind turbine blades 5, which receive wind flowing in from a direction opposite to a direction at the time of normal power generation, generate rotation force for rotating the rotor head 4 in a direction same as the direction at the time of power generation. As yaw rotation of the wind turbine unit by the motoring progresses, the pitch angles of the wind turbine blades 5 only have to be changed to values suitable for the power generation to start the wind turbine generator 1.

According to the embodiment explained above, the yaw control for yaw-rotating the wind turbine unit according to a change in wind direction is performed by effectively using the pitch driving unit 21 that individually controls pitch angels of the plural wind turbine blades 5. Therefore, the yaw driving apparatus that controls a direction of the wind turbine unit with the yaw motor is unnecessary.

By performing the motoring using the generator 11, it is possible to obtain yaw rotating force by aerodynamic force even when the natural wind power is not obtained. Therefore, it is also possible to perform yaw rotation independently using this yaw rotating force or perform yaw rotation to supplement insufficiency of aerodynamic force obtained from the natural wind power.

Therefore, in the wind turbine generator 1 explained above, the yaw control for the wind turbine unit can be reduced in cost. Further, it is possible to perform yaw control also advantageous for a reduction in size and weight of the nacelle 3 included in the wind turbine unit. A motor for maintenance needs to be set separately from the yaw motor.

By adopting the embodiment explained above, since the yaw driving apparatus and an attaching seat therefore are not provided. Therefore, it is possible to reduce machining at the time of manufacturing and realize a reduction in cost including cost for maintenance of the yaw motor, driving gears, and the like.

A yaw rotating shaft fixed to the tower 2 is generally set free, Mz (see FIG. 5) as moment load from the rotor 4 is substantially reduced and load acting on the main shaft 9, a main bearing, a main bearing base, and a nacelle base plate is reduced. This also makes it possible to realize a substantial reduction in cost.

The present invention is not limited to the embodiment explained above and can be changed as appropriate without departing from the gist of the present invention.

For example, the yaw rotation control explained above may stabilize the operation of yaw rotation while appropriately controlling braking force of a yaw braking device.

A yaw rotating wheel may be a roller bearing or a slide bearing.

The wind turbine generator 1 of the present invention is not limited to the wind turbine generator including the gear box 10 and the wind turbine generator of the upwind type. The present invention can also be applied to wind turbine generators of a gearless type and a downwind type. The wind turbine generator of the downwind type receives wind power on front surfaces of rotation surfaces of wind turbine blades arranged behind a nacelle. Like the wind turbine generator of the upwind type, the wind turbine generator of the downwind type operates with front surfaces of the rotation surfaces of the wind turbine blades directed to the upwind.

The invention claimed is:

1. A yaw rotation control method for a wind turbine generator comprising:
   an information acquiring step for acquiring azimuth angle information of a wind turbine blade rotation surface and wind direction information; and
   a yaw rotating step for driving, according to a deviation between the azimuth angle information and the wind direction information, a front surface of the wind turbine blade rotation surface in an upwind direction at a time of start of the wind turbine generator,
   wherein the yaw rotating step includes a pitch angle control step for controlling wind turbine blade pitch angles at a predetermined azimuth angle, and
   the pitch angle control step includes a motoring step for rotating a generator as a motor.

2. The yaw rotation control method for a wind turbine generator according to claim 1, wherein, in the pitch angle control step, the wind turbine blade pitch angles at an azimuth angle of about 90 degrees or about 270 degrees are controlled to be further on a fine side or a feather side than the wind turbine blade pitch angles at preceding and following azimuth angles.

3. The yaw rotation control method for a wind turbine generator according to claim 1, wherein in the motoring step, the wind turbine blade pitch angles at an azimuth angle of about 0 degree or about 180 degrees are controlled to be further on a fine side or a feather side than the wind turbine blade pitch angles at preceding and following azimuth angles.

4. The yaw rotation control method for a wind turbine generator according to claim 1, wherein a number of revolutions of the generator is gradually reduced after reaching a predetermined number of revolutions.

5. The yaw rotation control method for a wind turbine generator according to claim 1, wherein a number of revolutions of the generator is kept substantially constant after reaching a predetermined number of revolutions.

6. A yaw rotation control method for a wind turbine generator comprising:
   an information acquiring step for acquiring azimuth angle information of a wind turbine blade rotation surface and wind direction information; and
   a shutdown time yaw rotating step for driving, according to a deviation between the azimuth angle information and the wind direction information, a front surface of the wind turbine blade rotation surface in a downwind direction at a time of shutdown of the wind turbine generator,
   wherein the shutdown time yaw rotating step includes a shutdown time pitch angle control step for controlling wind turbine blade pitch angles at a predetermined azimuth angle, and
   the pitch angle control step includes a motoring step for rotating a generator as a motor.

7. The yaw rotation control method for a wind turbine generator according to claim 6, wherein, in a yaw rotating step and the shutdown time yaw rotating step, a yaw motor is not used in driving the wind turbine blade rotation surface.

8. A wind turbine generator configured such that a wind turbine unit including plural wind turbine blades is supported to be capable of yaw-rotating with respect to a tower and receives wind power from a front of the wind turbine unit according to a fluctuating wind direction to generate power, the wind turbine generator comprising:
   a generator that is driven by the wind power received by the wind turbine blades to generate the power and can be changed to be applied as a motor;
   a pitch driving unit that individually controls pitch angles of the wind turbine blades;
   a wind direction detecting unit that detects fluctuating wind direction information;
   a yaw rotating position detecting unit that detects azimuth angle information of rotation surfaces of the wind turbine blades; and
   a control unit that performs wind turbine blade pitch angle control at a predetermined azimuth angle to drive a front surface of a wind turbine blade rotation surface in a downwind direction at a time of shutdown of the wind turbine generator according to a deviation between the wind direction information detected by the wind direction detecting unit and the azimuth angle information of a wind turbine blade rotation surface acquired by the yaw rotating position detecting unit, and that calculates, for each of the wind turbine blades, a pitch angle command value for causing, with aerodynamic force, power for yaw-rotating the wind turbine unit, and outputs the pitch angle command value to the pitch driving unit,
   wherein the control unit performs motoring using the generator as the motor according to an operation state and supplements yaw rotating force.

* * * * *